(12) United States Patent
Dyer et al.

(10) Patent No.: US 6,349,340 B1
(45) Date of Patent: Feb. 19, 2002

(54) DATA MULTICAST CHANNELIZATION

(75) Inventors: Douglas M. Dyer, Indialantic; David A. Boley, Melbourne Beach, both of FL (US)

(73) Assignee: Exigent International, Inc., Melbourne, FL (US)

( * ) Notice: Subject to any disclaimer, the term of this patent is extended or adjusted under 35 U.S.C. 154(b) by 0 days.

(21) Appl. No.: 09/482,496

(22) Filed: Jan. 13, 2000

(51) Int. Cl.[7] .............................................. G06F 15/16
(52) U.S. Cl. ........................ 709/231; 709/200; 709/204; 709/227
(58) Field of Search ................................. 709/231, 200, 709/201, 203, 213, 232, 227, 228, 229, 225, 204

(56) References Cited

U.S. PATENT DOCUMENTS

| | | | |
|---|---|---|---|
| 5,459,725 A | | 10/1995 | Bodner et al. |
| 5,664,091 A | * | 9/1997 | Keen |
| 5,949,789 A | * | 9/1999 | Davis et al. ................. 370/452 |
| 6,026,289 A | * | 2/2000 | Zellner et al. ............... 455/403 |
| 6,118,785 A | * | 9/2000 | Araujo et al. ................ 370/401 |

OTHER PUBLICATIONS

"Writing IP Multicast–enabled Applications", Stardust Technologies, Inc., Campbell, CA.
"Implementing IP Multicast in Different Network Infrastructures", Stardust Technologies, Inc. Campbell, CA.
"IP Multicast Backgrounder", Stardust Technologies, Inc., Campbell, CA.
"Introduction to IP Multicast Routing", Startust Technologies, Inc., Campbell, CA.
"How IP Multicast Works", Stardust Technologies, Inc., Campbell, CA.
"Higher Level Protocols used with IP Multicast", Startust Technologies, Inc., Campbell, CA.
"Protocols and Local Area Networks", (www.veritatis.com).
"Ethernet Device Drivers", (www.austin.ibm.com).
"The Data Link Interface", (www.partner.digital.com).
IP Multicast: Glossary of Terms, (www.ipmulticast.com).
"Simple, Low–overhead Multicast", (www.stardust.com).

* cited by examiner

Primary Examiner—Ario Etienne
(74) Attorney, Agent, or Firm—Akerman Senterfitt (57) ABSTRACT

A method for receiving requested multicast data over a plurality of multicast communications channels includes the steps of determining a source communications channel for receiving requested multicast data; enabling the source communications channel; receiving the requested multicast data through the source communications channel; and, forwarding the requested multicast data to requesting processes. In the preferred embodiment, the source communications channel is overloaded with multicast data from a plurality of multicast data sources. In consequence, the method can further include both the steps of filtering from the received multicast data, unwanted multicast data; and, routing the filtered multicast data to requesting processes. In a preferred embodiment, the determining step can further include hashing an identifier corresponding to a multicast data source of the requested multicast data; and, identifying as the source communications channel, the hashed identifier.

17 Claims, 6 Drawing Sheets

DATA MULTICAST CHANNELIZATION

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present invention concerns network data distribution and more particularly a method for providing improved performance in networks using (multicast technology.

2. Description of the Related Art

In a traditional distributed data network, one or more server nodes and a plurality of client nodes communicate with one another using well known network protocols. Typically, distributed data applications include server nodes which can provide centralized distribution and consolidation of data for client nodes connected to the network. Currently, client nodes are approaching two extremes: the "thin-client" which acts on or monitors small subsets of data, and the "fat client" that performs data reduction on large amounts of real-time information over the network, data recording, and other similar activities. With regard to the latter, critical processing can occur within the fat client and often necessitates managing large subsets of high-speed, real-time data.

Management of high-speed data across distributed data networks can involve two basic approaches. The more common approach has been referred to as the "client-based" approach, where client nodes notify server nodes of their interest in certain desired data. In effect, the client-based approach implements a subscribe-unsubscribe paradigm. Using the client-based approach, servers can individually distribute data packets to each interested, subscribing client. The client-based approach, however, tends to overburden the server as network demands grow. Specifically, as additional client nodes are added to the network, the server not only must individually distribute the data packets to each interested client node, but also the server must individually distribute the data packets to each additional subscribing client node. Hence, as the client node list grows, so does the server's workload.

The second approach is a "server-based" approach, in which servers broadcast data packets to all client nodes residing on the network. By using multicast technology, the server merely sends each data packet once. Correspondingly, all client nodes receive the singly transmitted data packet simultaneously. Specifically, to broadcast a data packet, the server transmits the data packet to a multicast destination address identifying a particular multicast session, rather than a specific physical address of a client node. Interested client nodes merely subscribe to the multicast address, rather than the server, in order to receive the broadcast data. By employing multicasting technology, as the number of client nodes increase, servers are not required to match the increased number of client nodes with an increased number of data packet transmissions. In consequence, the servers do not become over-burdened and may feed even larger client bases. Still, because all client nodes receive each broadcast data packet, regardless of the content of the data packet, each client node must filter unwanted data upon receipt of each data packet.

Client nodes generally are uninterested in most of the broadcast data and, as a result, client nodes expend substantial processor resources identifying and discarding unwanted data packets. In particular, network applications in client nodes receiving broadcast data must identify each received data packet and determine whether or not to discard the same. Hence, while the foregoing approach allows a server to provide data at higher data transmission rates to more clients nodes, because of the aforementioned processor overhead, the approach eventually can limit the client node's ability to filter unwanted data packets. Specifically, although present computers are reaching ever-faster processing speeds and network bandwidths are large, network users increasingly broadcast more data across the network, challenging the client node's ability to filter the unwanted data packets while, at the same time, satisfying their increasing appetite for data.

SUMMARY OF THE INVENTION

A method for efficient filtering of unwanted data in a multicast network environment in accordance with the inventive arrangement satisfies the long-felt need of the prior art by applying a combination hardware and software solution which selectively filters multicast data by selectively disabling channels containing unwanted data. The inventive arrangements have advantages over all other data distribution methods, and provides a novel and nonobvious method for receiving the benefits of multicasting while avoiding the drawbacks associated with such systems.

The method can include receiving from a process in a client node a request for multicast data; identifying a source for the requested multicast data; determining a source communications channel for receiving the requested multicast data; enabling the source communications channel; receiving the multicast data through the source communications channel; and, forwarding the multicast data to the requesting client node process. Furthermore, the method can include filtering from the received multicast data unrequested multicast data; discarding the unrequested multicast data; and, forwarding the filtered multicast data to the process.

The preferred embodiment can include several dynamic methods for determining a source communications channel. For instance, the determining step can include hashing the identified source of the requested multicast data; and, identifying as the source communications channel the hashed source of the requested multicast data. Alternatively, the determining step can include receiving from the source of the requested multicast data a channel identification message identifying the source communications channel. Finally, the determining step can include monitoring the multicast channels for the requested multicast data; and processing multicast data received by way of the multicast channels to determine a source communications channel on which the requested multicast data is being transmitted. In contrast to the above-identified dynamic methods, at least one static method for determining a source communications channel can be employed. Specifically, in the static method, the determining step can include constructing a configuration table of sources of multicast data and source communications channels. Each source of multicast data in the configuration table can correspond to a source communication channel. Subsequently, a source communications channel corresponding to a source of the requested multicast data can be located in the configuration table .

A method for receiving requested multicast data over a plurality of multicast communications channels includes the steps of determining a source communications channel for receiving requested multicast data; enabling the source communications channel; receiving the requested multicast data through the source communications channel; and, forwarding the requested multicast data to requesting processes. In the preferred embodiment, the source communications channel is overloaded with multicast data from a plurality of multicast data sources. In consequence, the method can further include both the steps of filtering from the received multicast data, unwanted multicast data; and, forwarding the filtered multicast data to requesting processes.

In a preferred embodiment, the determining step can further include hashing an identifier corresponding to a source of the requested multicast data; and, identifying as the source communications channel, the hashed identifier. In an alternative embodiment, the determining step can include the steps of receiving from a source of the requested multicast data a channel identification message identifying the source communications channel. In yet another alternative embodiment, the determining step can include monitoring a plurality of communications channels for the requested data; and processing multicast data received by way of the communications channels to determine at least one source communications channel on which the requested data is being transmitted. Unlike the above identified dynamic methods for determining the source communications channel, an alternative embodiment can incorporate a static method. In the static method, the determining step can include constructing a configuration table of sources of multicast data and source communications channels, where each source of the multicast data corresponds to a source communication channel. Subsequently, a source communications channel corresponding to a source of the requested multicast data can be located in the configuration table A method for efficient filtering of multicast data in a network client node can comprise the following steps: receiving from a plurality of processes in a client node requests for multicast data; identifying a multicast data source for each request; determining a source communications channel for each multicast data source; enabling each source communications channel; receiving multicast data through the source communications channels; and forwarding to each requesting process, multicast data corresponding to the request by the requesting process. The method can further include filtering from the multicast data received from the source communications channels, unrequested multicast data; discarding the unrequested multicast data; and, routing the filtered multicast data to the processes. In the preferred embodiment, the determining step can include hashing each identified multicast data source; and, identifying source communications channels for each hashed multicast data source. Moreover, in one embodiment, the identified source is a domain name having at least one module containing the requested multicast data.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Data multicast channelization provides a unique solution to the problem of server-based multicast distribution of data in a distributed data network. Multicast channelization utilizes a network protocol feature generally available in network interface circuitry which can permit selectable hardware filtering of multicast data streams. In the preferred embodiment of the invention, data grouped into modules residing in data domains can be requested by processes distributed on client nodes in a distributed data network. Using the inventive method, only those multicast channels corresponding to the domain of the requested data are hardware enabled. Additionally, software filtering of the enabled multicast channels can be performed to further discard unwanted data included on an overloaded instance of the enabled multicast channel.

Figure 1:
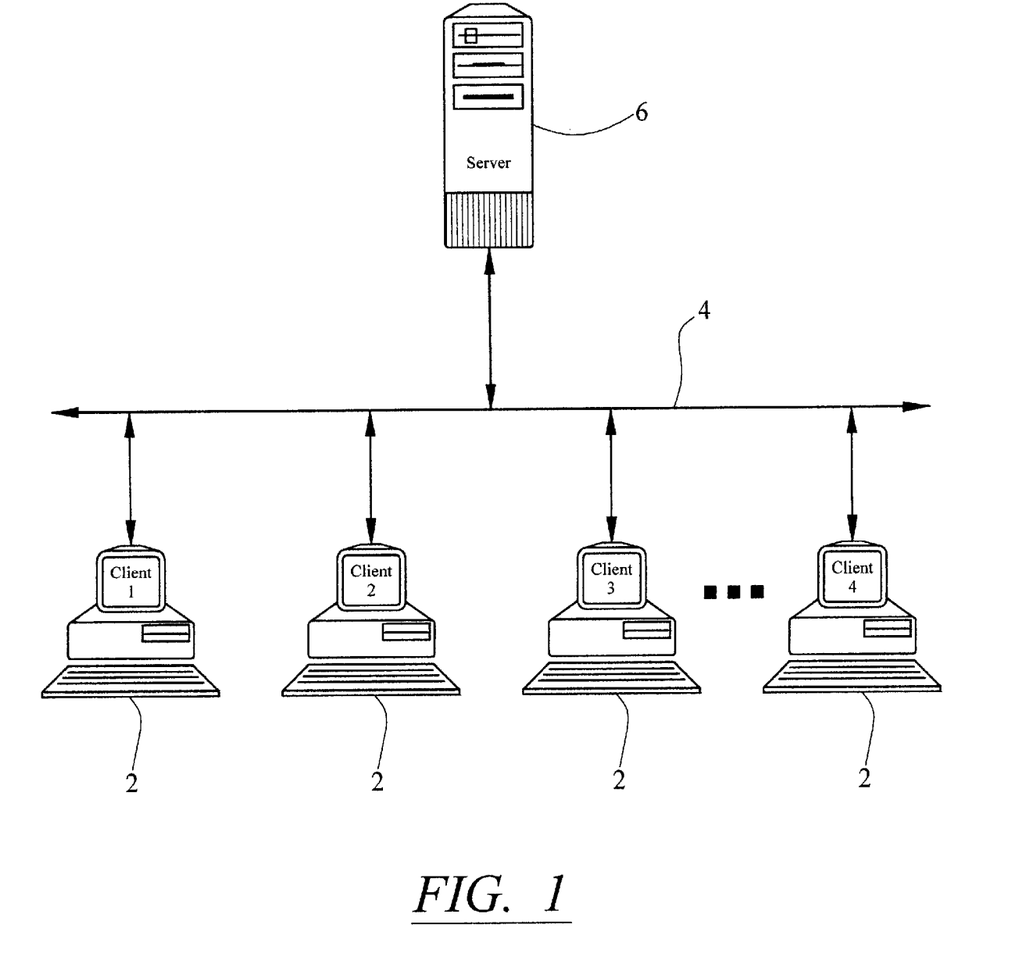
FIG. 1 is a diagram showing a server based computer network in which the present invention can be implemented.

FIG. 1 shows a network configuration upon which the present invention can operate. In FIG. 1, several client computers 2 are operably connected to a local area network (LAN) 4 having a server 6 similarly connected to the LAN 4. LAN 4 can be an Ethernet network, a Token-Ring network or any other suitable network topology suitably configured for handling multicast messaging. Each client computer 2 attached to the LAN 4 can consist of any suitable client computer known in the art. Clients 2 include adequate hardware to perform processing required at the client node, display video output, accept keyboard and mouse input, and to process network communications. One skilled in the art will also recognize that the invention is not limited to an individual LAN topology. Rather, the present invention can further operate within a larger WAN configuration in which a plurality of LANs can be inter-networked using, for example, router connectivity.

Figure 2:
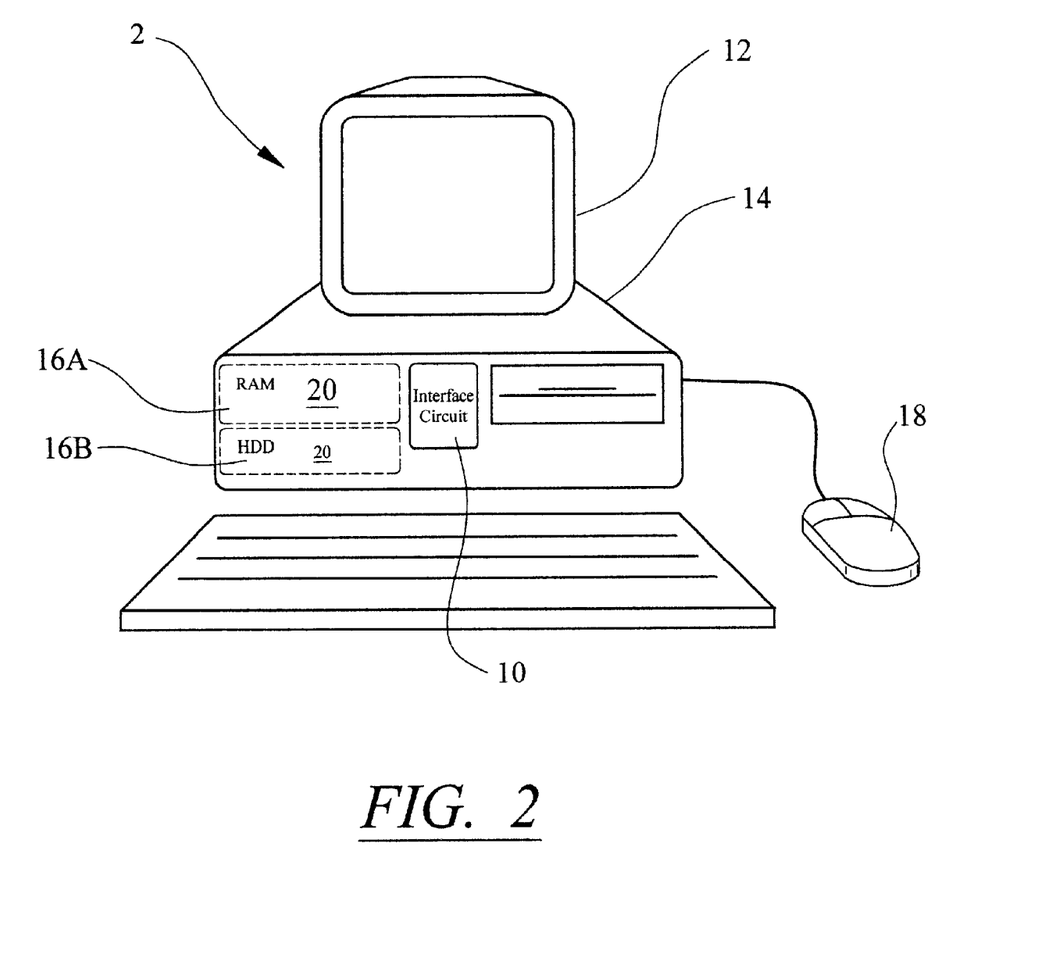
FIG. 2 is a diagram showing a typical client node.

According to a preferred embodiment, clients 2 are so-called fat clients where substantial real time processing for applications is performed. FIG. 2 shows a typical client computer system 2 for use in conjunction with the present invention. The system is preferably comprised of a general purpose computer 14 including a central processing unit (CPU), one or more fixed memory devices 16A and 16B and associated circuitry. The CPU can be comprised of any suitable microprocessor or other electronic processing unit, as is well known to those skilled in the art. An example of such a CPU would include the Pentium II or Pentium III brand microprocessor available from Intel Corporation or any other microprocessor having similar capabilities.

The system also preferably includes suitable interface circuitry 10 for receiving updated data as well as any necessary command and control messages. The interface circuitry 10 can be in the form of a conventional network communication card configured for reception of multicast data. An example of a conventional network communication card can include an Ethernet network adapter.

At least one user interface display unit 12 such as a video data terminal (VDT) is preferably operatively connected to the computer 2. An interface device, such as mouse 18, can also be provided with the system, but is not necessary for operation of the invention as described herein. The computer system preferably includes one or more computer fixed memory devices 16A, 16B, which can include an electronic random access memory 16A and a bulk data storage medium 16B, such as a magnetic disk drive. Significantly, the inventive method described in detail herein, can be embodied in a routine set of microprocessor instructions, stored in the bulk data storage medium 16B, and loaded upon execution in random access memory 16A. Specifically, a network applications program 20 can be stored in the bulk data storage medium 16B and loaded for execution into electronic random access memory 16A. The various hardware requirements for the computer system as described herein can generally be satisfied by any one of many commercially available high speed general purpose personal computers offered by manufacturers such as International Business Machines Corporation (IBM), Compaq, Hewlett Packard, or Apple Computers.

In a preferred embodiment which shall be discussed herein, the operating system for client node computer system 2 can be one of the Windows family of operating systems, such as Windows NT or Windows 98 which are available from Microsoft Corporation of Redmond, Wash. However, the system is not limited in this regard, and the invention may also be used with any other type of computer operating system such as UNIX, Linux, MacOS or Solaris. The system as disclosed herein can be implemented by a programmer, using commercially available development tools for the operating systems described above, for example Microsoft Interdev for the Microsoft Windows environment or any of the GNU compilers included as part of the Linux operating system.

Server 6 is an application server computer system having a network operating system for serving files for clients connected to the network 4. The network operating system can be Microsoft Windows NT server, but the invention is not limited in this regard and any other commercially available network operating system can also be used for this purpose, for example Novell Netware, UNIX, Linux or OS/2 Warp Server. The server can be a computer system similar to client computer system 2 with an appropriate network communications port. Alternatively any midrange computer or mainframe type computer with a network communication port can also be used as is well known in the art.

Figure 3:
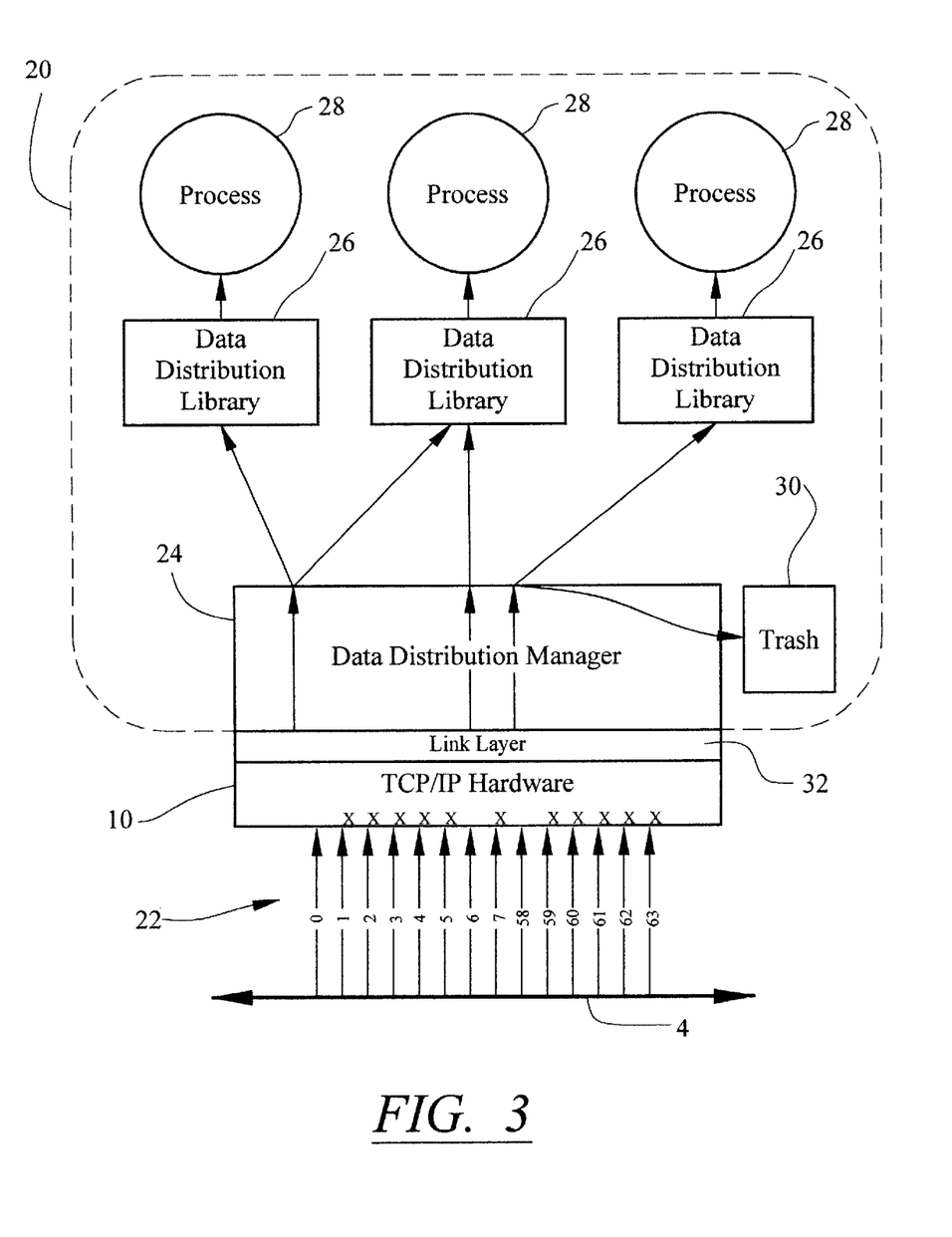
FIG. 3 is a high level architecture of a typical network client node in FIG. 1 showing network application software and hardware.

FIG. 3 is a high level architecture of a typical network client node 2 in FIG. 1 showing network application software 20 and network interface circuitry 10. Network application software 20 can include both high level processes 28 capable of requesting needed data from the server 6, and data distribution software for distributing the requests and requested data between the server 6 on the LAN 4 and the processes 28. The data distribution software can include both data distribution libraries 26 and a data distribution manager 24. Each data distribution library 26 can include a catalog of data, available from a module on the network 4 and requestable by a process 28. Hence, each process 28 can request data cataloged in the data distribution library 26. Each of the requests for data and requested data can be communicated between the processes 28 and the LAN 4 through channels 22 leading to and from the interface circuitry 10.

In transmitting data to processes 28 in client nodes 2, the preferred embodiment employs multicast technology to broadcast data to client nodes 2. Multicast technology is a data broadcasting method well-known in the art and described in substantial detail in RFC 1112, *Host Extensions for IP Multicast* available from the Internic at http://ds.internic.net/rfc/rfc 1112.txt and incorporated herein by reference. By using multicast technology, the server 6 can send a packet of data once, with each client node 2 receiving the broadcast data packet simultaneously.

Thus, in the preferred embodiment, the server 5 sends to each client node 2 all multicast data without regard to the requirements of each client node 2. As a result, each client node 2 must filter the incoming streams of data, identifying requested data within the corpus of the broadcast data, and discarding all non-requested, unwanted data. Finally, each client node 2 must appropriately route the requested multicast data to requesting processes 28 within the client node 2.

Advantageously, unlike prior art distributed data networks employing multicast technology in which network applications software examines each incoming data packet, identifying therein unwanted data, in the preferred embodiment, client nodes 2 can filter the incoming streams of data both in the interface circuitry 10 and in the network applications software 20. With regard to the interface circuitry 10, in the preferred embodiment, the interface circuitry 10 can include up to 64 addressable channels 22 for receiving and transmitting data streams onto the LAN 4. Still, the invention is not limited in this regard. Rather, most client node platforms, for example the interface circuitry of the SPARC Workstation available from SUN Microsystems of Palo Alto, California includes several addressable multicast-enabled channels. Additionally, one skilled in the art will recognize the general availability of link layer programming interfaces for controlling underlying interface circuitry.

In accordance with the present invention, the data distribution manager 24 can enable and disable each channel 22 in the interface circuitry 10 using a corresponding link layer programming interface 32 to the interface circuitry 10.

However, if an addressable channel 22 is disabled, no data can pass through the channel 22 to the network application software 20. For example, as shown in FIG. 3, although all channels 22 can receive data, the interface circuitry 10 can filter all channels 22 except for channels 0, 6 and 58. As is apparent from FIG. 3, when channels 2–5, 7 and 59–63 are disabled, data streaming on those channels are completely filtered. Thus, as an example, the network application software need not analyze and filter incoming data on channel 63 in consequence of the filtering of the incoming data by the disabling of channel 63. Notwithstanding, the foregoing example is included for illustrative purposes only. In fact, using a link layer programming interface 32 to the interface circuitry 10, the present invention can filter any combination of channels 22 addressable within the interface circuitry in order to efficiently filter unwanted data residing on disabled channels.

Notably, to accommodate a quantity of multicast data sources which exceed the number of channels 22, each channel 22 can be overloaded. That is, more than one data stream can be multiplexed on a single channel 22. In consequence, since the interface circuitry 10 can either enable or disable only a complete channel 22, it is possible that unwanted data multiplexed on an enabled channel 22 can escape the filtering process performed by the interface circuitry 10 and can pass through to the network application software 20. To compensate, in the preferred embodiment an additional filtering process can be performed in the network application software 20. In particular, the data distribution manager 24 can examine incoming data in the data streams on each enabled channel. For example, as shown in FIG. 3, the data distribution manager 24 can extract from the enabled channels 0, 6 and 58 data requested by processes 28. The data distribution manager 24 subsequently can forward the requested data to the requesting processes 28.

Advantageously, in examining data in incoming data streams, the data distribution manager 24 can discard overloaded unwanted data by depositing the unwanted data into a representative trash can 30. Nevertheless, one skilled in the art will recognize that the foregoing is suggested for explanatory purposes only. In fact, a more efficient and preferred method of discarding unwanted data is simply to not further transmit the unwanted data to a process 28.

In order for the data distribution manager 24 to distribute only requested data to the requesting processes 28 by performing both filtering in the TCP/IP hardware 10 and software filtering in the data distribution manager 24, the data distribution manager 24 determines which hardware channels 22 should be enabled and which should be disabled. To make this determination, the data distribution manager 24 can map all data, requested and unrequested to the hardware channels 22. More particularly, the data distribution manager 24, in a static solution, can reference, or in a dynamic solution, be informed by the data source of the correct channel to enable in order to receive data requested by a process 28.

In the static solution, a configuration file can be created in the data distribution manager 24 to include a static mapping of data domains corresponding to the requested data to hardware channels 22. Thus, upon a request for data by a process 28, the data distribution manager 24 need only consult the configuration file to determine an appropriate channel 22 to enable in the interface circuitry 10. One skilled in the art will recognize, however, that the invention is not limited to the mapping of data domains. Rather, the configuration file can include a static mapping of any identifier corresponding to a source of the requested multicast data, for example a proprietary network address or a network adapter address corresponding to the network source of the multicast data. Thus, generally, the configuration file can map each identifier to a corresponding hardware channel 22.

The inventive method can include several dynamic solutions to the channel determination problem. In one dynamic solution, the data distribution manager 24 can receive a point-to-point message from the source of the requested data identifying an appropriate channel 22 though which the data distribution manager 24 can receive the requested data. In yet another dynamic solution, the data distribution manager 24 can poll all channels 22 to identify in each data stream the source of the data stream. In this way, the data distribution manager 24 can dynamically map the source of the data stream with a corresponding channel 22.

In a preferred embodiment of the invention, however, the data distribution manager 24 can dynamically identify an appropriate channel to enable through the use of hashing techniques, well-known in the art. Generally, searching and storing algorithms store data in a dictionary or symbol table. Each item in the dictionary has a corresponding search key through which the item can be identified for retrieval from the dictionary. Hashing techniques use hash tables which can be dynamically computed using a hash function. Specifically, the hash function uses arithmetic operations on the data to generate and scatter the search key values into positions in the hash table. Ideally, each search key corresponds to a different position. Advantageously, the same arithmetic operation can be performed on a search request to generate a search key and, accordingly, locate corresponding data.

Hence, applying hashing techniques to the present invention, in the preferred embodiment, each multicast data source can broadcast the data on a channel selected by applying a hashing function to the name of the domain containing the data to be broadcast. Correspondingly, in determining an appropriate channel 22 to receive the incoming multicast data, the data distribution manager 24 can dynamically apply the hashing function to the domain name associated with requested multicast data to identify the corresponding channel 22 on which to receive the broadcast data. The application of the hashing function to the domain name can be termed, "hashing the domain name." One skilled in the art will recognize, however, that the invention is not limited with regard to hashing only the domain name. Rather, the hashing technique can operate by hashing any identifier corresponding to the multicast data source.

The search key resulting from hashing the domain name can be termed, "a hashed domain name." The hashed domain name corresponds to an appropriate channel 22 through which the data distribution manager 24 can receive the incoming multicast data. Having identified the corresponding channel 22, the data distribution manager 24 subsequently can enable the identified channel 22 through which the data distribution manager 24 can receive requested broadcast multicast data.

Figure 4A:
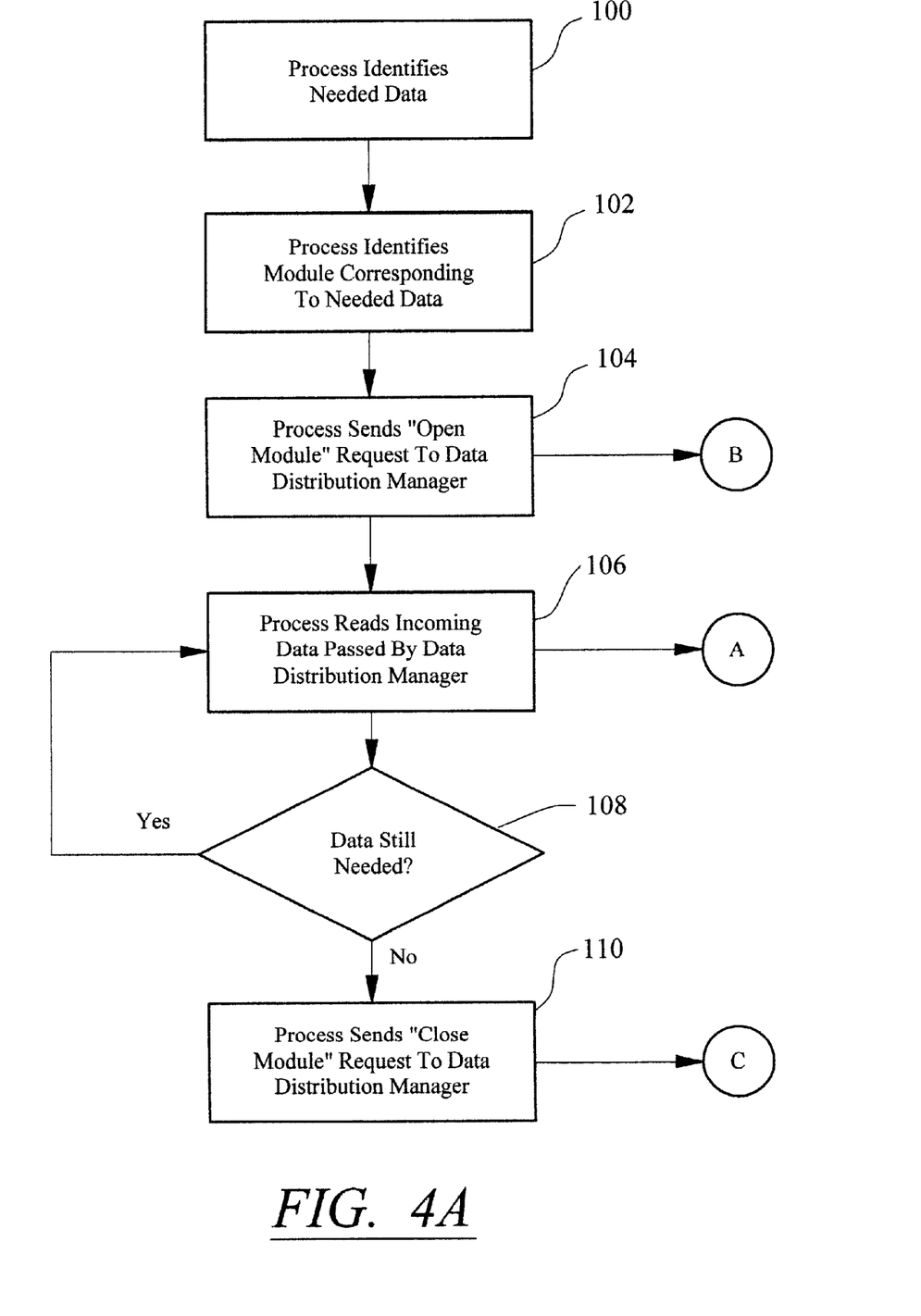
FIGS. 4A–4C, taken together, are a flow chart showing a method according to a preferred embodiment of the invention.
Figure 4B:
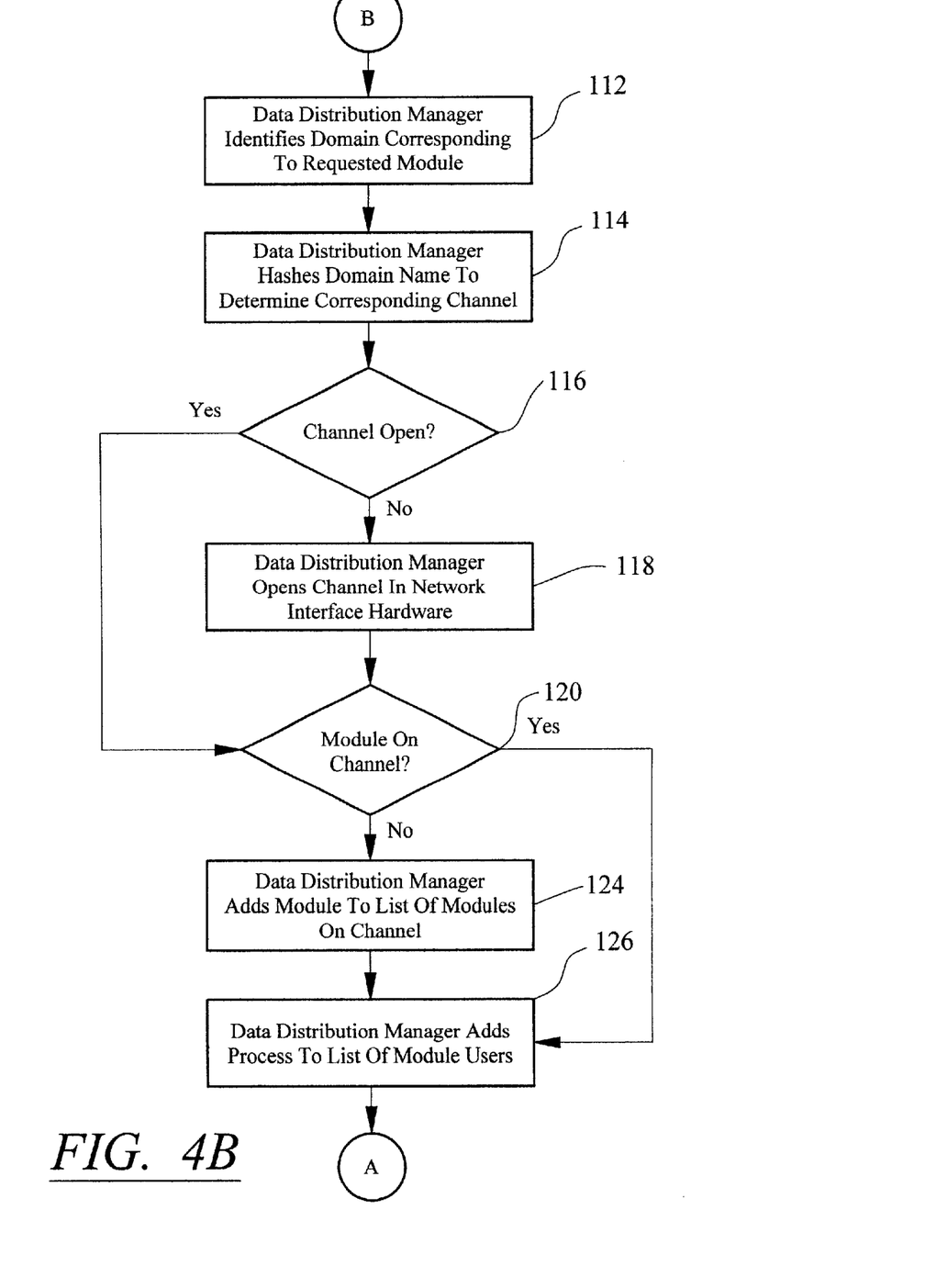
Figure 4C:
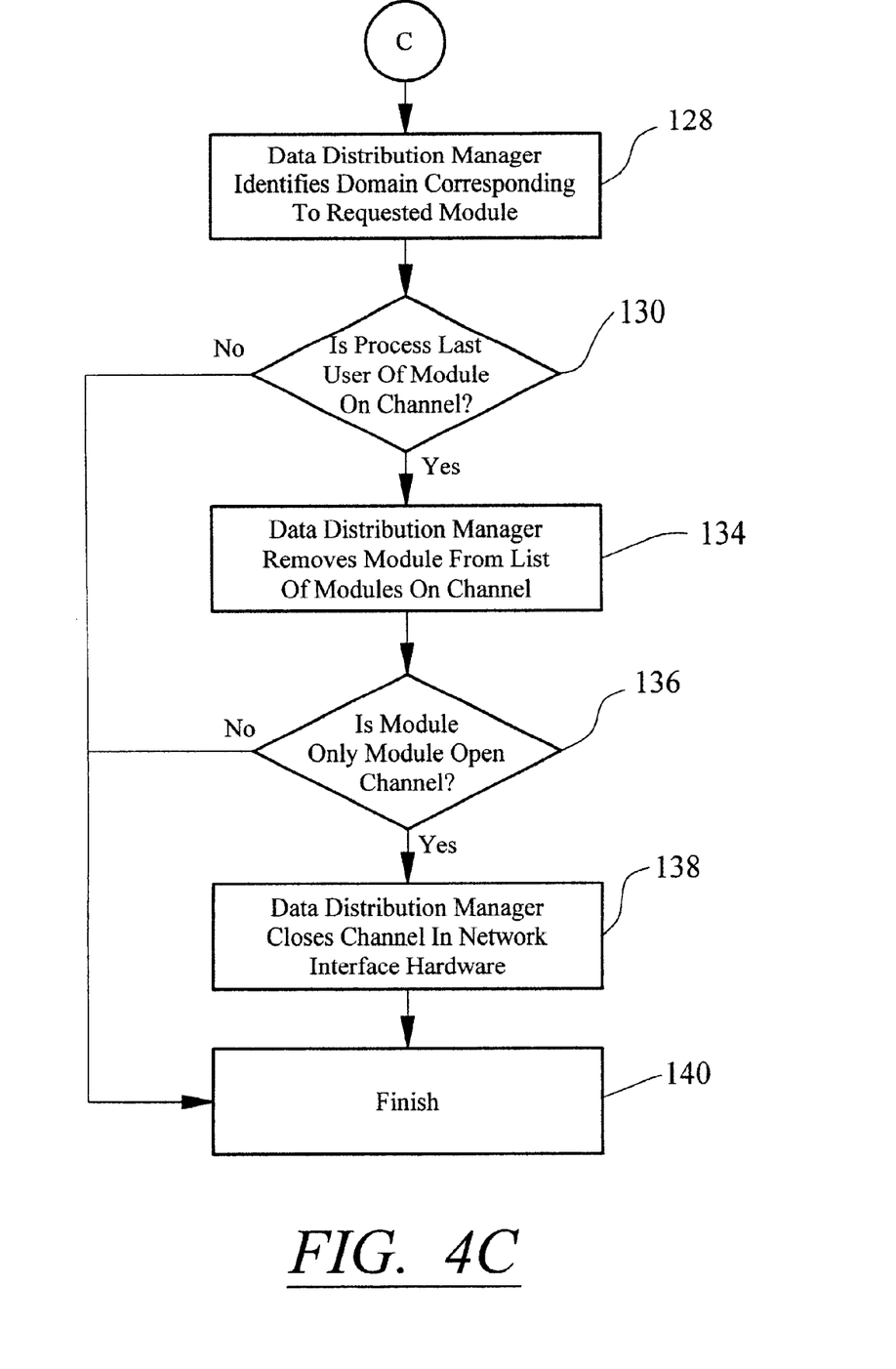

FIGS. 4A through 4C, taken together, are a flow chart showing a method according to a preferred embodiment of the invention. The method illustrated in FIGS. 4A through 4C preferably can be performed in the network application 20. More particularly, the inventive method involves the interplay between each process 28 requesting data from broadcast data sources on the LAN 4, for example server 6, and the data distribution manager 24, charged with the hardware and software filtering of broadcast data on the channels 22.

The inventive method begins in step 100 in which a process 28 identifies broadcast data required by the particular process 28. In the preferred embodiment, broadcast data can be grouped into data sets or modules. Furthermore, each module can be associated with a domain—typically the higher level source of the data. Nevertheless, the invention is not limited in this regard. Rather, the hierarchical structure of data-module-domain is only one possible arrangement of data. The invention can be equally as effective using a flat, data-only structure.

In step 102, the process 28 can query the data distribution library 26 to identify a module containing the requested broadcast data. Subsequently, in step 104, the process can subscribe to the required multicast data by sending an "open_module" request to the data distribution manager 24. Notably, the remainder of the subscription and filtering procedure remains transparent to the requesting process 28. Once the process 28 has subscribed to required multicast data, the process 28 need only receive the requested multicast data, from time to time, as the multicast data is broadcast from the multicast data source. Thus, pending the receipt of the requested data from the data distribution manager 24, the requesting process 28 can resume normal operations.

Turning now to FIG. 4B, upon receipt of an open_module request, transmitted in step 104 of FIG. 4A, in step 112, the data distribution manager 24 can identify a domain corresponding to the requested module. In step 114, the data distribution manager 24 can apply a hashing function to the domain name to determine an appropriate channel 22 for enablement. If, in step 116, the determined channel 22 is not already open, then in step 118, the data distribution manager 24 can open the channel, for example using a transport control protocol (TCP) "socket()" function call, in which an Internet protocol (IP) source address, IP destination address, source port and destination port are specified. Significantly, because the requested data can be IP Multicast data, the IP source address can be a class D IP multicast address, described in detail in RFC 1112.

As discussed in detail above, each channel 22 can be overloaded with multiple data streams from multiple broadcast data sources. Hence, although, in step 116, the data distribution manager 24 may have identified an already open channel 22, the data distribution manager 24 may presently exclude data sourced from the desired multicast data source. Thus, in decision step 120, the data distribution manager 24 determines if the desired module is not presently software filtered as unwanted data. Specifically, the data distribution manager 24 can maintain a list of modules overloaded on each opened channel 22. By querying the list of modules, the data distribution manager 24 can detect the presence of a module on an opened channel 22.

More particularly, the data distribution manager 24 can maintain a list of processes subscribing to data from a particular module overloaded on each opened channel 22. In step 120, from the list of processes subscribing to data from a particular module, the data distribution manager 24 can determine if a process already subscribes to a module present on an opened channel 22. If another process already subscribes to the particular module, the requesting process 28 can merely be added to the list of process in step 126. Otherwise, if the requesting process 28 is the first to request data from the module, the data distribution manager 24, in step 124 can subscribe to the module on the opened channel 22 by adding the module to the list of modules overloaded on the opened channel 22. Finally, in step 126, the data distribution manager 24 can add the requesting process 28 to the list of processes requesting data included in the module.

Returning to FIG. 4A, subsequent to subscribing to required multicast data by sending an open_module message in step 104, the process 28 can proceed under normal operations until receiving from the data distribution manager 24 requested broadcast data. More particularly, as the data distribution manager 24 identifies broadcast data on opened channels pertaining to modules included in the list of modules, the data distribution manager can consult the list of module users and route to each process 28 in the list of module users, the received broadcast data. In this way, the process 28 transparently receives requested broadcast data while unrequested broadcast data is selectively discarded, first at the interface circuit 10 layer and second at the data distribution manager 24 layer.

A process 28 can continue to receive requested broadcast data until the process 28 no longer needs the requested broadcast data. If, in decision step 108, it is determined that the process 28 no longer requires the requested multicast data, in step 110, the process 28 can unsubscribe to the multicast data by transmitting to the data distribution manager 24 a "close_module" request. Notably, the remainder of the unsubscription procedure remains transparent to the requesting process 28. Once the process 28 has unsubscribed to formerly required multicast data, the process 28 can return to normal operations. The formerly requested multicast data, at the behest of the data distribution manager 24, will thereinafter be software and, possibly hardware filtered, so that the process 28 will no longer receive broadcast data packets from the source of the formerly requested multicast data.

Turning now to FIG. 4C, upon receipt of the close_module request, in step 128, the data distribution manager 24 can remove the requesting process 28 from the list of module users. If, in decision step 130, the requesting process 28 is not the last process requiring use of the module, the data distribution manager 24 need perform no other steps as the data distribution manager 24 still must distribute data in the module to other processes. In contrast, if in decision step 130 the requesting process 28 is the last process requiring use of the module, in step 134 the data distribution manager 24 can unsubscribe the requesting process 28 from the broadcast data by removing the module from the list of modules on the overloaded opened channel 22. Advantageously, if however, as determined in decision step 136, the opened channel 22 had not been overloaded so that only data streams from one source module had made use of the channel 22, then the data distribution manager 24 can disable the channel 22. The data distribution manager 24 can close the channel 24 in step 138, again using the link layer programming interface to the interface circuitry 10. Subsequently, the method can be terminated in step 140.

In sum, server-based approaches to distributing data to client nodes using multicast techniques are vulnerable to performance penalties caused by shrinking bandwidth in consequence of adding client nodes to the distributed data network. The inventive multicast channelization strategy can increase the bandwidth available to the expanding client node base by distributing the broadcast data across multiple channels. Consequently, clients nodes can selectively filter unwanted broadcast data within the network interface circuitry of each client node. Specifically, to avoid excessive software filtering, client nodes can only enable channels in the network interface circuitry where data of interest is streaming. While software filtering may still be required in cases where the channels are overloaded, the performance gain still can be significant.

We claim:

1. A method for receiving requested multicast data over a plurality of multicast communications channels comprising:
   selecting from among the plurality of multicast communications channels a source communications channel for receiving said requested multicast data;
   enabling said selected source communications channel;
   receiving said requested multicast data through said enabled source communications channel;
   forwarding said requested multicast data to requesting processes; and,
   disabling said selected source communications channel when said requesting processes indicate that no further data is requested to be received over said selected source communications channel.

2. The method according to claim 1 wherein said source communications channel is overloaded with multicast data from a plurality of multicast data sources.

3. The method according to claim 2 further comprising the steps of:
   filtering from said received multicast data, unwanted multicast data; and, forwarding said filtered multicast data to requesting processes.

4. The method according to claim 1 wherein said selecting step is further comprised of:
   hashing an identifier corresponding to a source of said requested multicast data; and,
   identifying as said source communications channel said hashed identifer.

5. The method according to claim 1 wherein said selecting step is further comprised of receiving from a source of said requested multicast data a channel identification message identifying said source communications channel.

6. The method according to claim 1 wherein said selecting step is further comprised of:

monitoring a plurality of said communications channels for said requested multicast data; and processing multicast data received by way of said communications channels to select at least one source communications channel on which said requested multicast data is being transmitted.

7. The method according to claim 1 wherein said determining step is further comprised of:

constructing a configuration table of multicast data sources and source communications channels, each multicast data source corresponding to a source communication channel; and, locating in said configuration table a source communications channel corresponding to a multicast data source of said requested multicast data.

8. A method for efficient filtering of data in a network client node for receiving multicast data over a plurality of multicast channels comprising:

receiving from a process in said client node a request for multicast data;

identifying a multicast data source for said requested data;

selecting from among the plurality of multicast communications channels a source communications channel for receiving said requested multicast data from said identified multicast data source;

enabling said selected source communications channel;

receiving said multicast data through said enabled source communications channel;

forwarding said multicast data to said requesting client node process; and, disabling said selected source communications channel when said requesting client node process indicates that no further data is requested to be received from said identified multicast data source over said selected source communications channel and no other requesting client node processes have indicated a continuing need for further data to be received from said identified multicast data source over said selected source communications channel.

9. A method according to claim 8, further comprising the steps of:

filtering from said received multicast data unrequested multicast data;

discarding said unrequested multicast data; and, forwarding said filtered multicast data to said process.

10. The method according to claim 8, wherein said selecting step is further comprised of:

hashing said identified multicast data source; and, identifying as said source communications channel said hashed multicast data source.

11. The method according to claim 8, wherein said selecting step is further comprised of receiving from said source a channel identification message identifying said source communications channel.

12. The method according to claim 8, wherein said selecting step is further comprised of:

monitoring said multicast channels for said requested multicast data; and processing multicast data received by way of said multicast channels to select a source communications channel on which said requested multicast data is being transmitted.

13. The method according to claim 8, wherein said selecting step is further comprised of:

constructing a configuration table of multicast data sources and source communications channels, each multicast data source corresponding to a source communication channel; and, locating in said configuration table a source communications channel corresponding to a multicast data source of said requested multicast data.

14. A method for efficient filtering of multicast data in a network client node comprising:

receiving from a plurality of processes in a client node requests for multicast data;

identifying a multicast data source for each said request; and, for each said identified multicast data source, selecting a corresponding source communications channel from among a plurality of multicast communications channels, enabling each said selected source communications channel, receiving multicast data through said source communications channels, forwarding to each requesting process, multicast data corresponding to said request by said requesting process, and disabling said selected source communications channel when said requesting client node process indicates that no further data is requested to be received from said identified multicast data source over said selected source communications channel and no other requesting client node processes have indicated a continuing need for further data to be received from said identified multicast data source over said selected source communications channel.

15. A method according to claim 14, further comprising the steps of:

filtering from said multicast data received from said source communications channels, unrequested multicast data;

discarding said unrequested multicast data; and, routing said filtered multicast data to said processes.

16. The method according to claim 14, wherein said selecting step is further comprised of:

hashing each said identified multicast data source; and, identifying source communications channels for each said hashed multicast data source.

17. The method according to claim 14, wherein said identified multicast data source is a domain name having at least one module containing said requested multicast data.

* * * * *